United States Patent
Imura

(10) Patent No.: US 6,859,487 B1
(45) Date of Patent: Feb. 22, 2005

(54) RADIO COMMUNICATION SYSTEM AND BASE STATION AND MOBILE TERMINAL TO BE EMPLOYED THEREIN

(75) Inventor: Minoru Imura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/514,706

(22) Filed: Feb. 28, 2000

(30) Foreign Application Priority Data

Mar. 3, 1999 (JP) .......................................... 11/054884

(51) Int. Cl.$^7$ ................................................ H04B 1/69
(52) U.S. Cl. ...................................... 375/141; 375/147
(58) Field of Search ................................ 375/130, 140, 375/141, 146, 147, 142, 150; 370/335, 342, 441

(56) References Cited

U.S. PATENT DOCUMENTS

| | | | | |
|---|---|---|---|---|
| 5,291,515 A | * | 3/1994 | Uchida et al. | 375/142 |
| 5,636,242 A | * | 6/1997 | Tsujimoto | 375/130 |
| 5,781,541 A | * | 7/1998 | Schneider | 370/335 |
| 5,859,870 A | * | 1/1999 | Tsujimoto | 375/143 |
| 5,960,028 A | * | 9/1999 | Okamoto et al. | 375/130 |
| 5,982,825 A | * | 11/1999 | Tsujimoto | 375/347 |
| 6,061,388 A | * | 5/2000 | Saulnier et al. | 375/130 |
| 6,075,808 A | * | 6/2000 | Tsujimoto | 375/143 |
| 6,128,330 A | * | 10/2000 | Schilling | 375/141 |
| 6,247,158 B1 | * | 6/2001 | Smallcomb | 714/786 |
| 6,310,907 B1 | * | 10/2001 | Tsujimoto | 375/141 |
| 6,400,753 B1 | * | 6/2002 | Kohli et al. | 375/134 |

FOREIGN PATENT DOCUMENTS

| | | |
|---|---|---|
| EP | 0849905 A2 | 6/1998 |
| EP | 000987849 A1 * | 9/1998 |
| EP | 001037422 A1 * | 5/1999 |
| GB | 2259430 A | 3/1993 |
| GB | 2326308 A | 12/1998 |
| JP | 9-116475 | 5/1997 |

* cited by examiner

Primary Examiner—Tesfaldet Bocure
(74) Attorney, Agent, or Firm—Scully, Scott, Murphy & Presser

(57) ABSTRACT

A radio communication system is capable of realizing a space diversity with single channel of an antenna and a receiver in a mobile communication equipment or by assigning one spread code. The radio communication system includes a base station and a mobile station. The base station effects spread spectrum of a transmission signal for outputting a spread signal, delays the spread signal for a predetermined delay period for outputting a delayed signal and transmits a signal derived by adding the delayed signal and the spread signal.

19 Claims, 9 Drawing Sheets

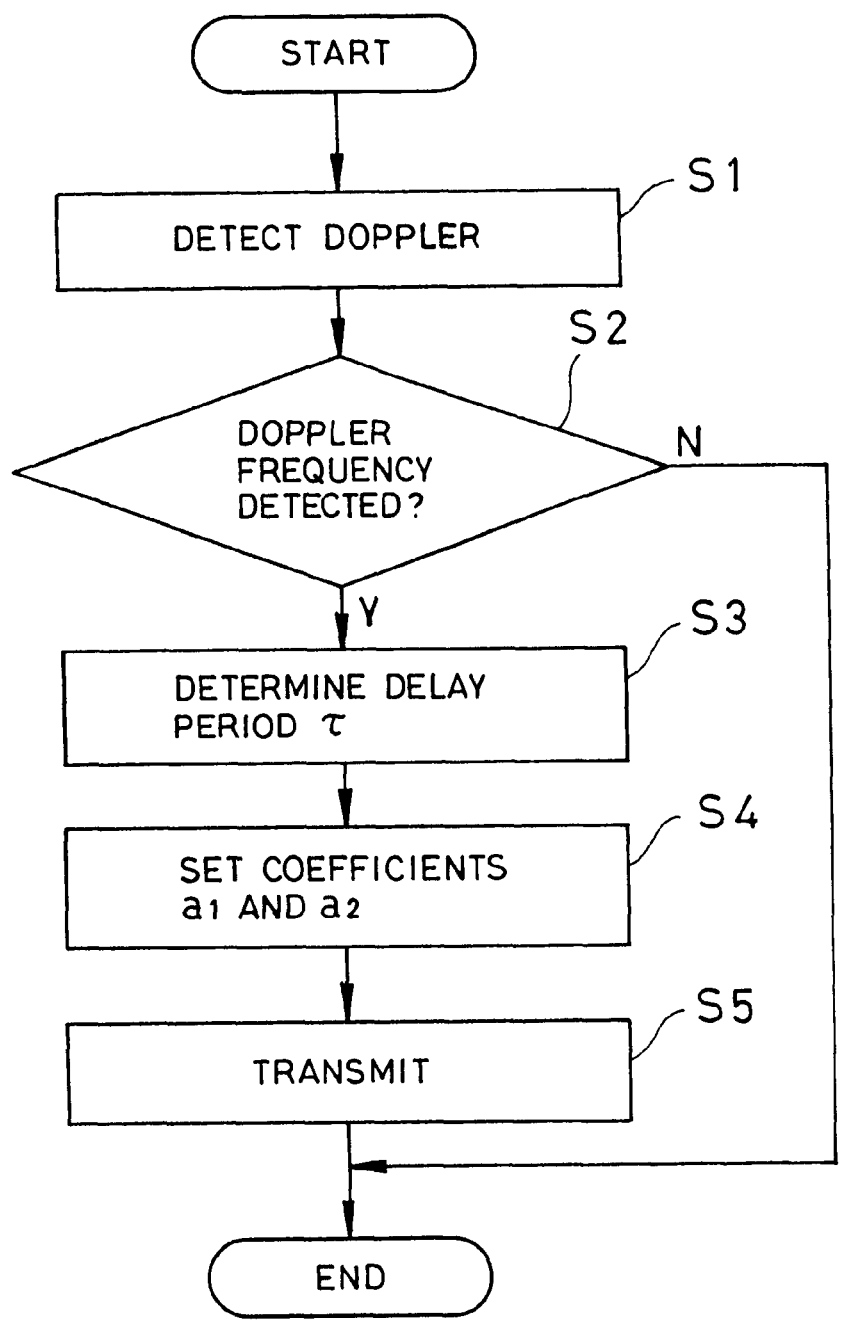

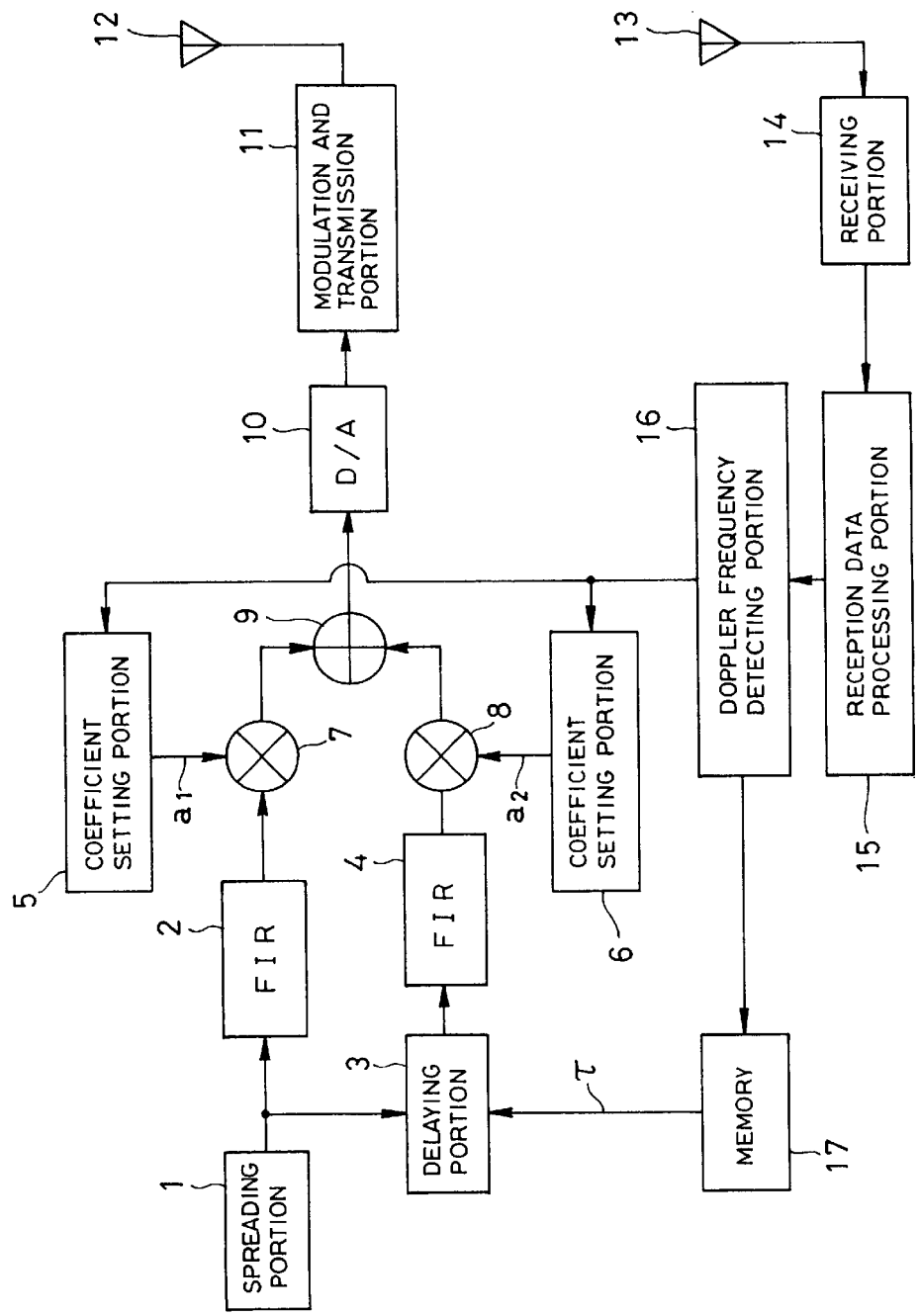

PRIOR ART

RADIO COMMUNICATION SYSTEM AND BASE STATION AND MOBILE TERMINAL TO BE EMPLOYED THEREIN

BACKGROUND OF THE INVENTION

1. Field of the Invention

The present invention relates generally to a radio communication system, and a base station and a mobile terminal to be employed therein. More particularly, the invention relates to a Direct Sequence-Code Division Multiple Access (DS-CDMA) radio communication system.

2. Description of the Related Art

FIG. 8 shows a construction of a receiver of the conventional cellular phone which realizes space diversity. This includes antennas and receiving portions which can prevent degradation of reception quality due to fading. In general, fading represents phenomenon to cause fluctuation of reception field intensity for addition disorderly as combining radio waves due to difference in propagation delay or so forth due to environmental condition of a transmission path from a transmitter to a receiver and moving condition on the side of cellular phone as mobile communication equipment.

Therefore, as shown in FIG. 8, by providing two antennas 41A and 41B at positions where reception field intensities are varied independently, drop of reception field intensities mutually compensate to prevent degradation of reception quality. In FIG. 8, receiving portions 42A and 42B and despreading portions 43A and 43B are provided corresponding to antennas 41A and 41B, respectively. Respective outputs of these despreading portions 43A and 43B are subject to demodulation process in a reception data processing portion 47.

Conventionally, the space diversity is realized by providing two sets of antennas and receiving portions on the side of the cellular phone. However, such construction is disadvantageous in consideration of down-sizing and reduction of weight of the cellular phone. Therefore, Japanese Unexamined Patent Publication No. Heisei 9-116475, a technology for solving the problem by time diversity has been disclosed. FIG. 9A shows a construction on transmission side and FIG. 9B shows a construction on reception side. Referring to FIGS. 9A and 9B, a transmission data is supplied to a spectrum spreading portion 102, and in conjunction therewith, to other spectrum spreading portion 103 with a delay for a period τ by a delay portion 101. These spread signals are added in an adder portion 104 and then transmitted from a transmitting portion 105 through an antenna 106.

On the other hand, on reception side, as shown in FIG. 9B, the spread signal is respectively supplied to despreading portions 109A and 109B from an antenna 107 via a receiving portion 108 and despread therein. Output signals of both despreading circuits 109A and 109B are subject to demodulation process by demodulating portions 110A and 110B. One of output signals of the demodulating portions 110A and 110B is delayed for a period τ by the delay portion 111 and input to a reception data processing portion 112 with matching a phase.

A time diversity is realized by providing respectively different delay periods for two branched transmission signals, transmitting the transmission signals by code multiplexing by spread spectrum, separating the transmission signals by despread spectrum for canceling a delay difference in the demodulated reception signal provided on the transmission side to match the timing.

In such time diversity system as illustrated in FIGS. 9A and 9B, it becomes necessary to assign respectively independent spread code for respective channels in order to perform two channels of spread spectrum process. Accordingly, two spread codes are used for communication to one mobile equipment to cause lowering of communication efficiency.

SUMMARY OF THE INVENTION

It is an object of the present invention to provide a radio communication system, and a base station and a mobile equipment to be employed therein, which can realize a time diversity only by assigning single spread code in communication with one mobile equipment.

According to the first aspect of the present invention, a radio communication system comprises:

a base station; and a mobile station, the base station effecting spread spectrum of a transmission signal for outputting a spread signal, delaying the spread signal for a predetermined delay period for outputting a delayed signal and transmitting a signal derived by adding the delayed signal and the spread signal.

According to the second aspect of the present invention, a base station in a radio communication system effecting spread spectrum of a transmission signal for outputting a spread signal, delaying the spread signal for a predetermined delay period for outputting a delayed signal and transmitting a signal derived by adding the delayed signal and the spread signal.

In the preferred construction, the base station may delay the spread signal for the delay period only when motion state of the mobile equipment is detected. The base station may comprise delay means for delaying the spread signal for the delay period depending upon a period of dropping of a reception field intensity in the mobile equipment due to fading, and transmitting means for transmitting with adding the spread signal and the delayed signal delayed by the delay means. The delay means may detect a motion speed of the mobile equipment and derives the period on the basis of the motion speed. The delay means may comprise frequency detecting means for detecting a frequency of fading on the basis of the motion speed, and means for delaying the spread signal for the delay period depending upon the frequency. The frequency detecting means may have a Doppler frequency detecting function.

The transmitting means may multiply the spread signal and the delayed signal with coefficients a1 and a2 wherein $a1^2 + a2^2 = 1$, and adds products. The delay period may be a preliminarily set period, in which a self-correlation of a spread code for spread spectrum becomes minimum. The delay period may be close to the delay period depending upon the period of dropping of a reception field intensity in the mobile equipment due to fading, and be a preliminarily set period, in which a self-correlation of a spread code for spread spectrum becomes minimum. The base station may notify the delay period to the mobile equipment. The mobile equipment may delay a reception signal and a spread code for the delay period notified from the base station, despreading may be performed for a delayed reception signal and non-delayed reception signal with a delayed spread signal and non-delayed spread signal, respectively to add signals after despreading to perform demodulation process for an output of addition.

According to the third aspect of the present invention, a mobile equipment in a radio communication system including a base station, and a mobile station, wherein the base station effecting spread spectrum of a transmission signal for outputting a spread signal, delaying the spread signal for a predetermined delay period for outputting a delayed signal and transmitting a signal derived by adding the delayed signal and the spread signal, the mobile equipment delaying a reception signal and a spread code for the delay period, despreading a delayed reception signal and the non-delayed reception signal with a delayed spread code and the non-delayed spread code, respectively to add both of signals after despreading to demodulate an output of addition.

The mobile equipment may detect information of the delay period contained in the reception signal for delaying the reception signal for the delay period. The signals after despreading may be added in-phase during the adding process.

In the operation, on the side of the base station, when fading due to motion of the mobile equipment is detected, the spread signal after spread spectrum of the transmission signal is delayed for the predetermined period for transmission with adding the delayed signal with the non-delayed spread signal. For example, the spread signal is delayed for a delay amount τ depending upon the period depending upon a period of dropping of the reception field intensity in the mobile communication equipment due to fading to transmit with adding the non-delayed spread signal and the delayed signal. When the mobile communication equipment is moved, there is fluctuation of the reception intensity called as a center value fluctuation or instantaneous value fluctuation. Even when the reception field intensity drops significantly at a certain timing t1 by the center value fluctuation or the instantaneous value fluctuation, the same data is transmitted again at a timing of t=t1+τ delayed for the delay amount τ. Thus drop of the reception field intensity can be successfully compensated.

On the other hand, on the side of the base station, the spread signal is delayed for the delay period where the self-correlation of the spread code becomes minimum, to add the delayed spread signal and the non-delayed spread signal for transmission. On the side of the mobile equipment, the reception signal is delayed for the delay period. The delayed reception signal and the non-delayed reception signal are subject to despreading with the delayed spread code and non-delayed spread code, respectively for in-phase addition of the results of despreasing. Thus, data having an intensity approximately double of normal reception process can be demodulated to cover drop of the reception signal due to fading.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings:

FIG. 2 is a flowchart showing general operation of the base station illustrated in FIG. 1;

FIG. 4 is a block diagram showing another embodiment of the base station according to the present invention;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a through understanding of the present invention. It will be obvious, however, to those skilled in the art that the present invention may be practiced without these specific details. In other instance, well-known structure are not shown in detail in order to avoid unnecessary obscurity of the present invention.

Figure 1:
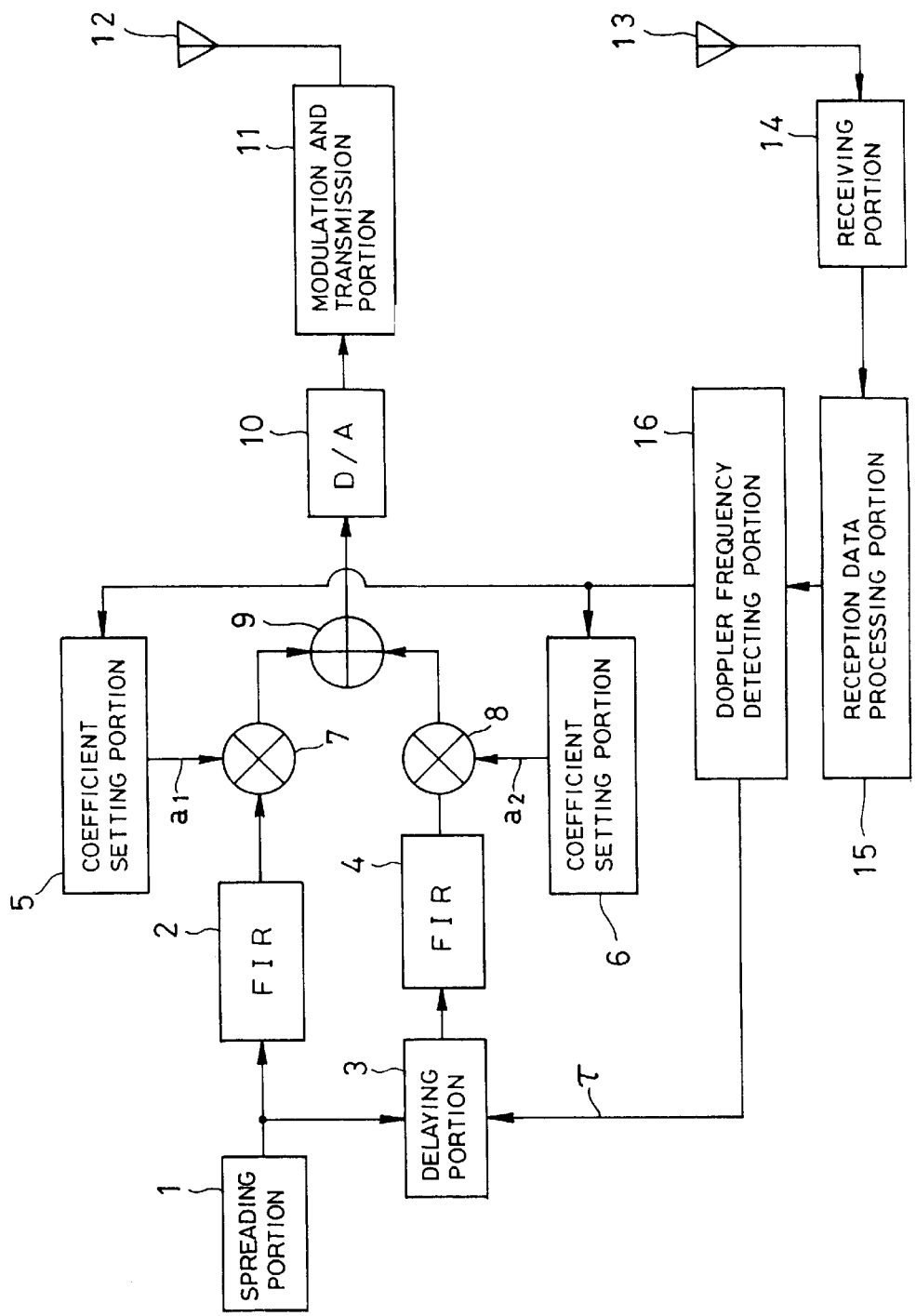
FIG. 1 is a block diagram showing one embodiment of a base station according to the present invention.

FIG. 1 is a schematic block diagram showing a general construction of one embodiment of a base station according to the present invention. A spectrum spreading portion 1 performs multiplication of a transmission data and a spread code. A spread output is then supplied to a FIR filter 2 and a delay portion 3. An output of the FIR filter 2 is supplied to a multiplier 7. On the other hand, an output of the delay portion 3 is supplied to a multiplier 8 via a FIR filter 4. In the multipliers 7 and 8, the outputs of the FIR filters 2 and 4 are multiplied with coefficients a1 and a2 set by coefficient setting portions 5 and 6, respectively. In this case, the following relationship is established with respect to coefficients a1 and a2:

$$a1^2 + a2^2 = 1 \qquad (1)$$

Outputs of these multipliers 7 and 8 are added by an adder 9 and then subject to D/A conversion by a D/A converter 10 to be converted into an analog signal to be transmitted from an antenna 12 via a modulating and transmitting portion 11.

A reception signal is received by a receiving portion 14 through an antenna 13 and is supplied to a Doppler frequency detecting portion 16 via a reception data processing portion 15. In the Doppler frequency detecting portion 16, a motion speed of a not shown mobile equipment (cellular phone) is detected. When the mobile equipment moves, a frequency transition is monitored by the Doppler frequency detecting portion 16 depending upon the motion speed thereof, on the side of the base station. At this time, in a receiver on the side of the mobile equipment, there is fluctuation of reception field intensity called as a center value fluctuation and instantaneous value fluctuation in a motion propagation characteristics thereof.

Therefore, on the side of base station, when frequency transition is monitored by the Doppler frequency detecting portion 16, coefficients a1 and a2 are set by coefficient setting portions 5 and 6, respectively to transmit data to be transmitted together with data delayed for a delay amount τ set by the delay portion 3. Here, assuming that a reception wave intensity monitored at a timing t=t1 causes substantial drop due to center value fluctuation or instantaneous value fluctuation as set forth above, the drop can be compensated since the foregoing data is transmitted again at a timing of t=t1+τ due to delay amounts τ which are varied independently.

In order to avoid interference to other user, coefficients a1 and a2 satisfying the foregoing equation (1) are set by the coefficient setting portions 5 and 6 so as not to cause variation in a transmission power (proportional to square of amplitude value). In the particular embodiment, it is preferred to set both of a1 and a2 at $(1/2)^{1/2}$. It should be noted that when the frequency transition is not monitored in the Doppler frequency detecting portion 16, a1=1 is set by the coefficient setting portion 5 and a2=0 is set by the coefficient setting portion 6.

The construction shown in FIG. 1 will be discussed in greater detail. Normally, a transmission data is generated to be transmitted to the FIR filter 2 by multiplying the information data and the spread code in the spreading portion 1. On the other hand, the transmission data is also transmitted to the delay portion 3 which can set a desired delay amount at the same time. Waveform shaping is performed in the FIR filters 2 and 4 in order to avoid intersymbol interference and input to the multipliers 7 and 8. According to coefficients a1 and a2 set by the coefficient setting portions 5 and 6, respective transmission data are varied the amplitude by the multipliers 7 and 8. Subsequently, both products of the multipliers 7 and 8 are added by the adder 9. Then, the adder output is converted by the D/A converter 10 into the analog signal and transmitted via the modulating and transmitting portion 11 and the transmission antenna 12.

Next, operation of the present invention will be discussed. Whether the mobile equipment is in motion or not can be sensed by the Doppler frequency detecting portion 16 on the side of the base station. On the other hand, fluctuation frequency can be generally derived as follow. Assuming that a carrier frequency is ω (MHz), a motion speed of the mobile equipment is v (km/h), a fading frequency f(Hz) is expressed by:

$$f=v/1.08\times10^3 \qquad (2)$$

Accordingly, the motion speed v can be derived based on the fading frequency f (Hz), and a spectral spreading breadth Bd (Hz) can be derived as follow:

$$Bd=2fv/c (c\text{:velocity of light})$$

The spectral spreading breadth Bd can be equivalently regarded as a breadth of time Tm=1/Bd. In this interval, non-correlated addition is repeated in mutual multipath. Accordingly, by setting the delay period τ at τ>Tm, it becomes possible to receive two transmission data behaving independently of each other.

Accordingly, when motion of the mobile equipment is detected by the Doppler frequency detecting portion 16, the multipliers 7 and 8 may be operated with operating the delay portion 3 for proving a delay period τ derived as set forth above and setting the coefficients a1 and a2 for satisfying the foregoing equation (1). FIG. 2 is a flowchart showing general operation of the base station.

Referring to FIG. 2, at first, in order to detect whether the mobile equipment is in motion or not, a Doppler frequency is detected in the Doppler frequency detecting portion 16 (step S1). Then, according to the foregoing equation (2), the Doppler frequency f is derived (step S2). If f is not derived, setting of the delay period is not performed. Accordingly, the delay portion does not operate to permit normal transmission. At this time, it is clear that coefficients are set respectively at a1=1 and a2=0, respectively. At step S2, if the Doppler frequency f is derived, the delay period τ is determined according to the equation(1) (step S3), and, at the same time, coefficients a1 and a2 are set (step S4). Then, transmission is performed (step S5).

When characteristics of the center value fluctuation, the instantaneous value fluctuation or so forth is preliminarily known, a period of drop of reception intensity can be predicted. By performing transmission with setting the delay amount τ of the delay portion 3 in the extent of 1/N (N:integer) of the predicted period, more accurate reception becomes possible even when substantial drop of the reception field intensity is caused at certain timing, since the same data can be monitored after the period τ on the side of the mobile equipment.

On the side of the mobile equipment, the delay amount τ may be searched independently or can be preliminarily transmitted from the base station side. On the side of the mobile equipment, when the delay amount is searched, the construction of the mobile equipment may be nothing different from the conventional mobile equipment and may have a construction to have an antenna of one channel, a receiving portion and a despreading portion. However, it encounters a drawback in necessity of a period for searching the delay period τ. Therefore, there is a method to notify the delay period τ from the base station side to the mobile equipment. In this case, transmission is performed in a signal format shown in FIGS. 3A and 3B.

Figure 3A:
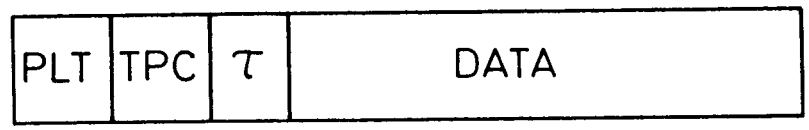
FIGS. 3A and 3B are illustrations showing a signal format from the base station to a mobile equipment.
Figure 3B:

As shown in FIGS. 3A and 3B, it is assumed that the delay period is basically inserted in an overhead portion of a time slot of a transmission signal. In FIG. 3A. the overhead portion is consisted of a PLT (pilot) signal, a TPC (Transmission Power Control) signal and τ (delay period) information. It should be noted that PLT is a pilot signal for measuring quality of down-link from the base station side to the mobile equipment side, TCP is a signal for controlling a transmission power in an up-link from the mobile equipment side to the base station side. These signals are known per se and not relevant to the present invention. Therefore, these signals will not be discussed in detail. In FIG. 3B, there is shown an example where the PLT signal is not included in the overhead portion. By this, in the mobile equipment, search of the delay period is unnecessary and the reception signal after the notified delay period, may be received and demodulated.

FIG. 4 is a block diagram of another embodiment of the base station according to the present invention. It should be noted that like components to those in the former embodiment shown in FIG. 1 will be identified by like reference numerals and detailed description thereof may be omitted in order to avoid redundant discussion for keeping the disclosure simple enough facilitate clear understanding of the present invention. In the foregoing embodiment shown in FIG. 1, when movement of the mobile equipment is detected in the Doppler frequency detecting portion 16, the delay amount τ is set depending upon the Doppler frequency. However, there is another system (detail of the principle will be discussed later) to select a delay period which is close to the delay period and has self-correlation of the spread signal minimum, namely a delay period where self-correlation becomes substantially "0". The shown embodiment is directed to this system.

In FIG. 4, the only point different from FIG. 1 is that a memory 17 is added. When motion of the mobile equipment is detected by the Doppler frequency detecting portion 16 and the delay period corresponding to the Doppler frequency is derived, the memory 17 is accessed with the delay period to read out the preliminarily stored delay period τ where self-correlation is close to "0". With the delay period τ thus read out, the transmission signal is delayed by the delay portion 3. The subsequent operation in the base station is the same as those of the embodiment shown in FIG. 1.

Figure 5:
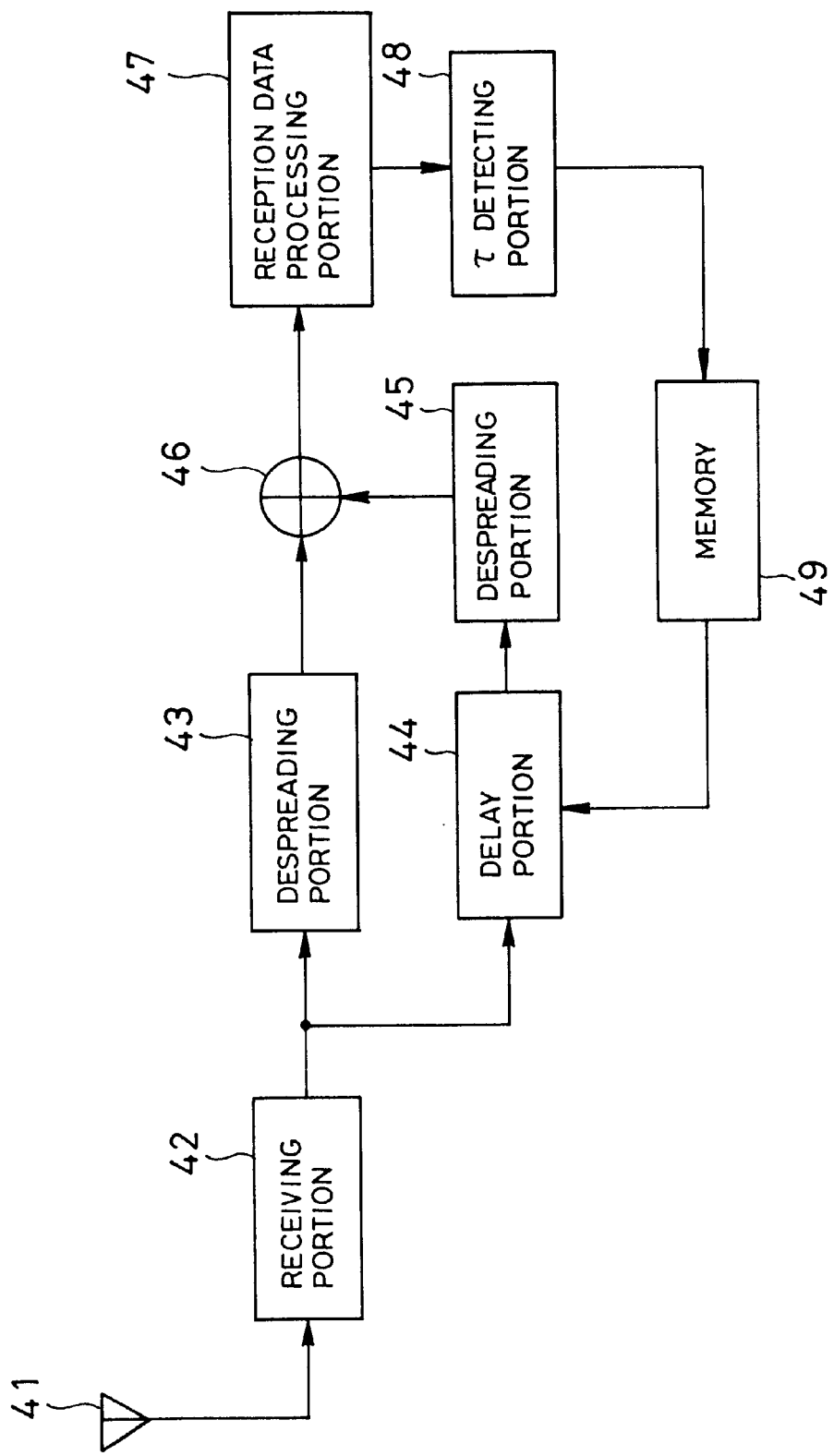
FIG. 5 is a block diagram showing one embodiment of the mobile equipment according to the present invention.

In the transmission signal, a delay period information for notifying the delay period τ to the mobile equipment side is included. In this case, the transmission signal is transmitted in the signal format of FIGS. 3A and 3B. A schematic block diagram of the mobile equipment which receives the transmission signal transmitted from the base station is shown in FIG. 5. In FIG. 5, the transmission signal is subject to despreading process in the despreading portion 43 via the antenna 41 and the receiving portion 42, and is input to the despreading portion 45 via the delay portion 44. In the delay portion, the reception signal and spread code are delayed for the delay period τ notified from the base station side. In the despreading portion 45, despreading process is provided for the delayed reception signal by the delayed spread code and in-phase addition with the output from the despreading portion 43 is performed by the adder 46. The adder output is subject to reception process, such as demodulation, in the reception data processing portion 47.

At this time, in a τ detecting portion 48, the delay period τ is detected from the signal demodulated by the reception data processing portion 47 to temporarily store in the memory 49. An output of the memory 49 is lead to the delay portion 44.

Figure 6:
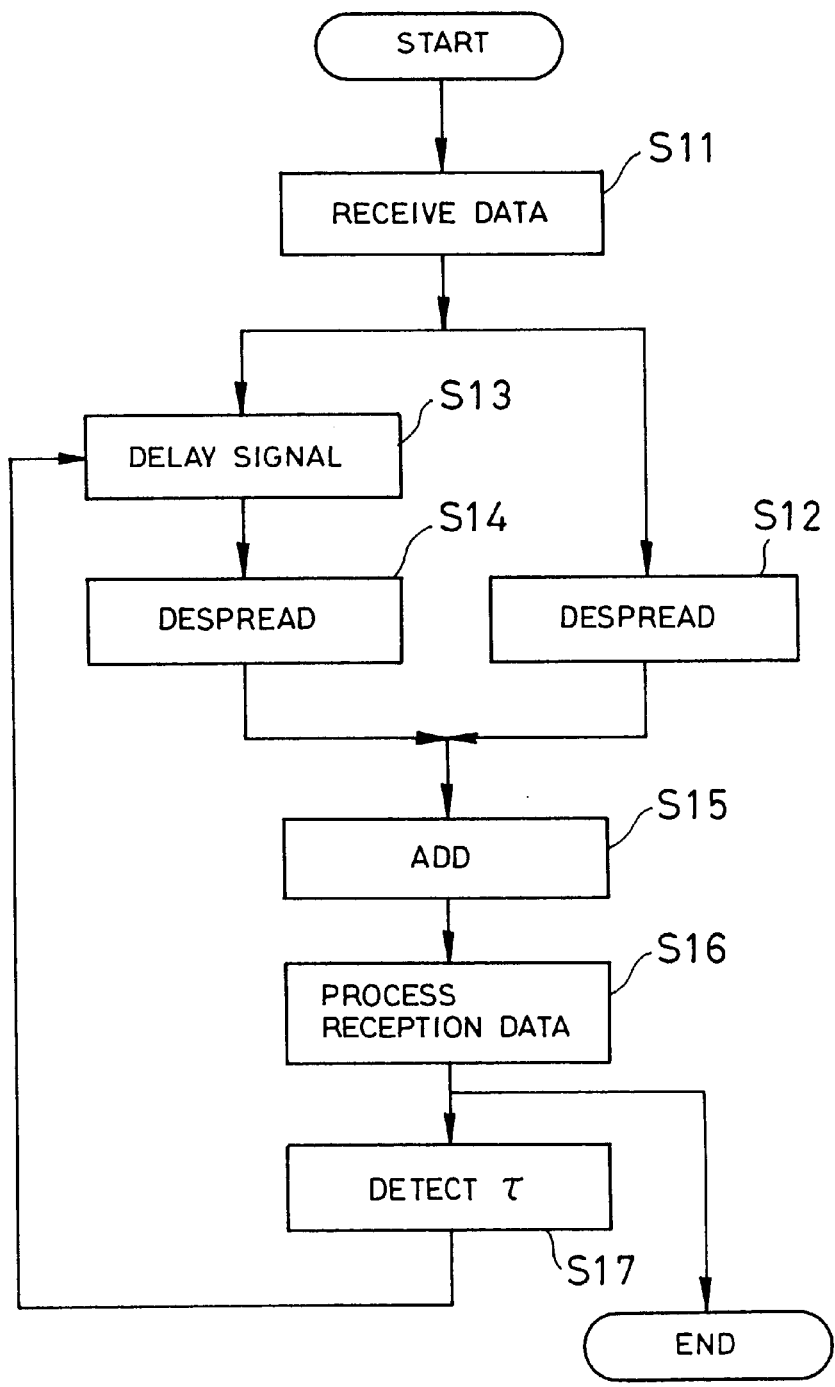
FIG. 6 is a flowchart showing general operation of the mobile equipment shown in FIG. 5.

FIG. 6 is a flowchart showing general operation of the mobile equipment. In response to reception of data (step S11), in parallel to despreading process of the reception signal (step S12), delay of the reception signal and spread code and despreading process of the delayed reception signal with the delayed spread code are performed (steps S13 and S14). Then, both of the despread outputs are subject to in-phase addition process (step S15) and reception data process is performed (step S16). At this time, delay period detection is performed (step S17). Then, with the detected delay period, the delay control of c(t) at step S13 is performed.

In the transmission and reception system employing the time diversity system transmitting the spread signal with delay for a delay period, in which self-correlation of the foregoing spread code becomes "0", the reason why the fading can be resolved on the side of the mobile equipment will be quantatively discussed using the following equations. At first, it is assumed that the data to be transmitted is b(t), the spread code is c(t), and both of the coefficients a1 and a2 are 1 for simplification.

On the base station side, when the delay portion 3 is operated by detecting fading, the transmission signal s(t) is expressed by:

$$s(t)=b(t) \cdot c(t)+b(t-\tau)\tau c(t-\tau) \quad (3)$$

On the other hand, on the reception side, it becomes necessary to take out b(t), it is only required to divide s(t) by the spread code in order to obtain b(t) from s(t) again. In practice, since the spread code is converted from (0, 1) to (1, −1) in D/A conversion, the spread code takes values of "+1" and "−1". Accordingly, division can be performed by multiplying the reception signal with the spread code.

Accordingly, on the reception side, $$s(t) \cdot c(t)=b(t) \cdot c(t)^2+b(t-\tau) \cdot c(t-\tau) \cdot c(t) \quad (4)$$

$$s(t) \cdot c(t-\tau)=b(t-\tau) \cdot c(t-\tau)^2+b(t) \cdot c(t-\tau) \cdot c(t) \quad (5)$$

is established. It should be noted that, in the foregoing equation (5), s(t) is normally delayed for τ in the delay portion 44. In practice, s(t) should be expressed as s(t−τ). However, there is no significant different even when it is expressed as s(t). Therefore, the expression s(t) is used for simplification.

Here, due to nature of the spread code set forth above, $$c(t)^2 1, \; c(t-\tau)^2=1 \quad (6)$$

is established. On the other hand, by setting τ to establish $$c(t-\tau) \cdot c(t)=0 \quad (7)$$

namely, self-correlation being "0", both of the equations (4) and (5) become b(t). By finally perform in-phase addition of these, 2b(t) is obtained. Thus, it becomes possible to demodulate the signal w ith eliminating fading therefrom.

On the other hand, as a further embodiment, the signal of 2b(t) can be attained on the reception side by preliminarily calculating the delay period where the self-correlation becomes "0" upon detection of movement of the mobile equipment, storing the same in the memory in the similar manner to that in the former embodiment and reading out from the memory. This embodiment can be realized with the same construction as that shown in FIG. 4.

Figure 7:
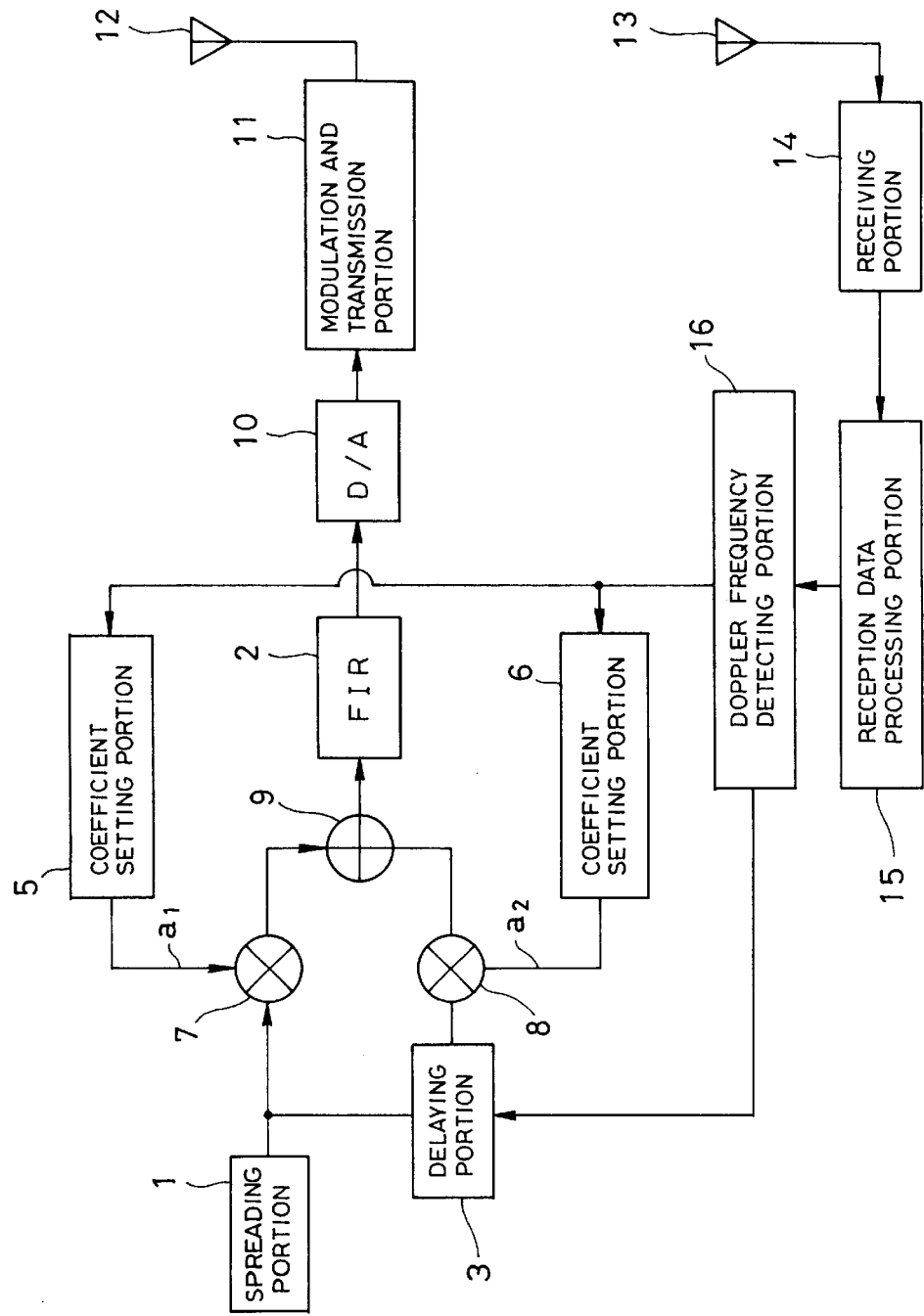
FIG. 7 is a block diagram showing a further embodiment of the base station according to the present invention.
Figure 8:
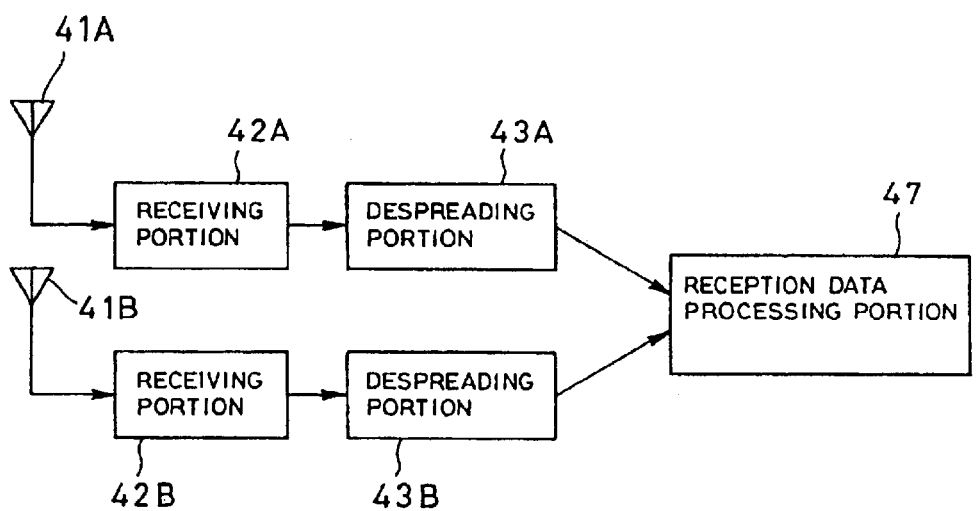
FIG. 8 is an illustration showing an example of the mobile equipment of the conventional space diversity system.
Figure 9A:
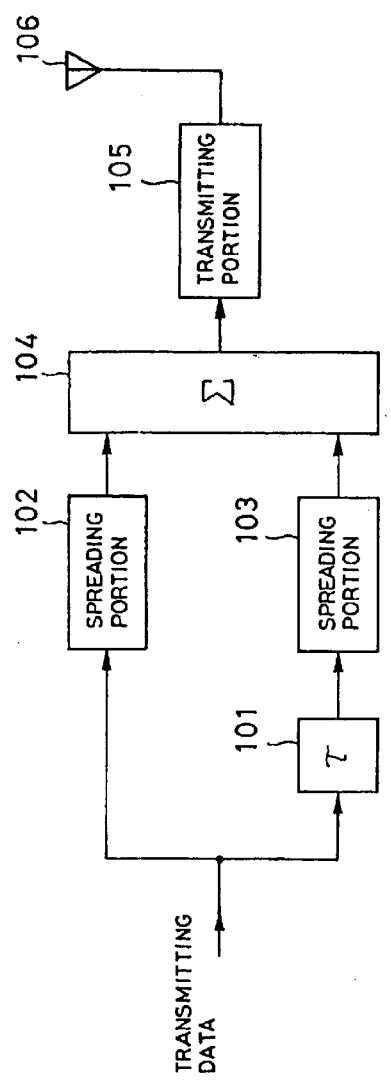
FIGS. 9A and 9B are illustrations for explaining examples of the conventional time diversity system.
Figure 9B:
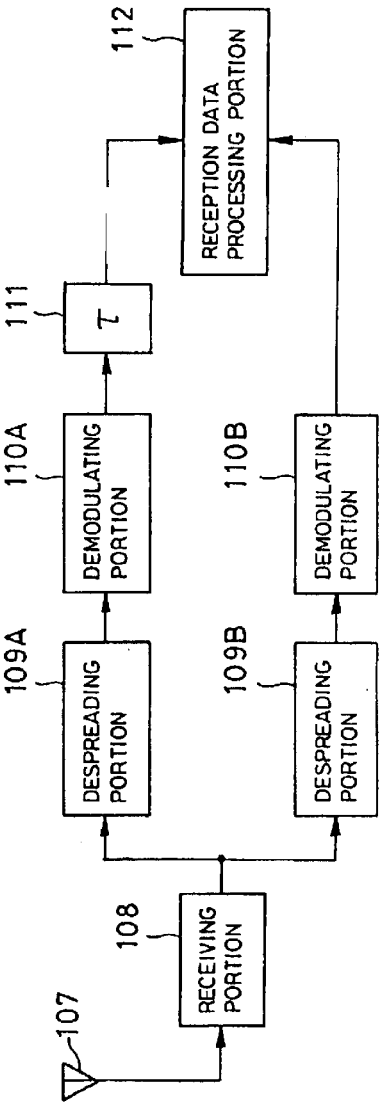

FIG. 7 is a block diagram of the further embodiment of the present invention. It should be noted that like components to those in the former embodiment shown in FIGS. 1 and 4 will be identified by like reference numerals and detailed description thereof may be omitted in order to avoid redundant discussion for keeping the disclosure simple enough facilitate clear understanding of the present invention. In the shown embodiment, two FIR filters 2 and 4 in the embodiment shown in FIG. 1 is replaced with the single FIR 2 located downstream side of the adder 9. Therefore, the construction can be simpler. Similar construction is applicable even for the construction shown in FIG. 4.

In the case of the embodiments shown in FIGS. 4 and 7, it is possible to independently search the delay period instead of notifying the same from the base station to the mobile equipment.

As set forth above, according to the present invention, it becomes possible to obtain space diversity function by providing a predetermined delay for the transmission signal after the process of spread spectrum of the transmission signal for transmitting with adding with the non-delayed spread signal on the base station side, and only by using the single antenna and the single receiving portion, and by assigning the single spread code.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A radio communication system comprising:

a base station; and a mobile station, said base station effecting spread spectrum of a transmission signal for outputting a spread signal, delaying said spread signal for a predetermined delay period for outputting a delayed signal and transmitting a signal derived by adding said delayed signal and said spread signal, wherein said base station delays said spread signal for said delay period only when motion state of said mobile equipment is detected.

2. A radio communication system as set forth in claim 1, wherein said base station comprises:

delay means for delaying said spread signal for said delay period depending upon a period of dropping of a reception field intensity in said mobile equipment due to fading; and transmitting means for transmitting with adding said spread signal and said delayed signal delayed by said delay means.

3. A radio communication system as set forth in claim 2, wherein said delay means detects a motion speed of said mobile equipment and derives said period on the basis of said motion speed.

4. A radio communication system as set forth in claim 3, wherein said delay means comprises:

frequency detecting means for detecting a frequency of fading on the basis of said motion speed; and means for delaying said spread signal for said delay period depending upon said frequency.

5. A radio communication system as set forth in claim 4, wherein said frequency detecting means has a Doppler frequency detecting function.

6. A radio communication system as set forth in claim 2, wherein said transmitting means multiplies said spread signal and said delayed signal with coefficients a1 and a2 wherein $a1^2+a2^2=1$, and adds products.

7. A radio communication system as set forth in claim 1, wherein said delay period is a preliminarily set period, in which a self-correlation of a spread code for spread spectrum becomes minimum.

8. A radio communication system as set forth in claim 1, wherein said delay period is close to the delay period depending upon the period of dropping of a reception field intensity in said mobile equipment due to fading, and is a preliminarily set period, in which a self-correlation of a spread code for spread spectrum becomes minimum.

9. A radio communication system as set forth in claim 1, wherein said base station notifies said delay period to said mobile equipment.

10. A radio communication system as set forth in claim 9, wherein said mobile equipment delays a reception signal and a spread code for said delay period notified from said base station, despreading is performed for a delayed reception signal and non-delayed reception signal with a delayed spread signal and non-delayed spread signal, respectively to add signals after despreading to perform demodulation process for an output of addition.

11. A base station in a radio communication system effecting spread spectrum of a transmission signal for outputting a spread signal, delaying said spread signal for a predetermined delay period for outputting a delayed signal and transmitting a signal derived by adding said delayed signal and said spread signal, wherein said base station delays said spread signal for said delay period only when motion state of said mobile equipment is detected.

12. A base station as set forth in claim 11, which comprises:

delay means for delaying said spread signal for said delay period depending upon a period of dropping of a reception field intensity in said mobile equipment due to fading; and transmitting means for transmitting with adding said spread signal and said delayed signal delayed by said delay means.

13. A base station as set forth in claim 12, wherein said delay means detects a motion speed of said mobile equipment and derives said period on the basis of said motion speed.

14. A base station as set forth in claim 13, wherein said delay means comprises:

frequency detecting means for detecting a frequency of fading on the basis of said motion speed; and means for delaying said spread signal for said delay period depending upon said frequency.

15. A base station as set forth in claim 14, wherein said frequency detecting means has a Doppler frequency detecting function.

16. A base station as set forth in claim 12, wherein said transmitting means multiplies said spread signal and said delayed signal with coefficients a1 and a2 wherein $a1^2+a2^2=1$, and adds products.

17. A base station as set forth in claim 11, wherein said delay period is a preliminarily set period, in which a self-correlation of a spread code for spread spectrum becomes minimum.

18. A base station as set forth in claim 11, wherein said delay period is close to the delay period depending upon the period of dropping of a reception field intensity in said mobile equipment due to fading, and is a preliminarily set period, in which a self-correlation of a spread code for spread spectrum becomes minimum.

19. A base station as set forth in claim 11, wherein said base station notifies said delay period to said mobile equipment.

* * * * *